(12) United States Patent
Kim et al.

(10) Patent No.: US 7,129,997 B1
(45) Date of Patent: Oct. 31, 2006

(54) MONITOR CASE COMPRISING FACILE DETACH STRUCTURE

(75) Inventors: Ki-Seon Kim, Suwon (KR); Seon-Woo Lim, Suwon (KR); Sang-Hyun Han, Yongin (KR); Sung-Su Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 955 days.

(21) Appl. No.: 09/503,240

(22) Filed: Feb. 14, 2000

(30) Foreign Application Priority Data

Feb. 13, 1999 (KR) .................................. 1999-5277
Feb. 13, 1999 (KR) .................................. 1999-5285

(51) Int. Cl.
*H04N 5/64* (2006.01)

(52) U.S. Cl. ...................................... 348/836; 361/682

(58) Field of Classification Search ................ 348/839, 348/843, 836, 825, 787, 794; 312/257.1, 312/263, 223.1, 223.2; 361/679, 682, 728, 361/730, 732, 692
See application file for complete search history.

(56) References Cited

U.S. PATENT DOCUMENTS

| 4,651,218 A | 3/1987 | Fazioli |
| 4,662,797 A | 5/1987 | Helgeland |
| 5,084,757 A | 1/1992 | Leo et al. |
| 5,122,928 A | 6/1992 | Lo |
| 5,305,110 A * | 4/1994 | Taki et al. .................. 348/836 |
| 5,575,545 A * | 11/1996 | Wang .................. 312/223.2 X |
| 5,587,876 A * | 12/1996 | O'brien et al. ............. 361/682 |
| 5,730,512 A * | 3/1998 | Heirich .................... 361/692 X |
| 5,793,494 A | 8/1998 | Douken et al. |
| 5,863,106 A * | 1/1999 | Beak ................... 312/223.2 X |
| 5,870,485 A | 2/1999 | Lundgren et al. |
| 6,233,026 B1 * | 5/2001 | Kim et al. .............. 348/825 X |

* cited by examiner

*Primary Examiner*—John G. Weiss
*Assistant Examiner*—Michael J. Fisher
(74) *Attorney, Agent, or Firm*—Robert E. Bushnell, Esq.

(57) ABSTRACT

A monitor housing has a front casing connected with a rear casing enclosing a cathode ray tube. The front casing has at least one snap portion at an upper rear surface of the same and at least one engaging pin at a lower rear surface. The rear casing has at least one engaging portion at an upper front surface for being detachable engaged with the front casing. At least one receiving hole is formed at a lower portion of the front surface, so that the rear casing is integrally engaged with the front casing in such a manner that the receiving hole is separately engaged to the engaging pin, and a snap pin engaged in the receiving hole for preventing the engaging pin from detaching from the receiving hole in the case that the engaging pin of the front casing is integrally engaged into the receiving hole of the rear casing for thereby significantly decreasing an assembling time with an easier assembling and disassembling operation of a front casing and a rear casing and enhancing an engaged state of the monitor.

25 Claims, 8 Drawing Sheets

MONITOR CASE COMPRISING FACILE DETACH STRUCTURE

CLAIM OF PRIORITY

This application makes reference to, incorporates the same herein, and claims all benefits accruing under 35 U.S.C. § 119 from an application entitled *Assembling Structure of Monitor Case* earlier filed in the Korean Industrial Property Office on 13 Feb. 1999, and there duly assigned Ser. No. 99-5277 by that Office and an application entitled *Assembling Structure of Monitor Case* earlier filed in the Korean Industrial Property Office on 13 Feb. 1999, and there duly assigned Ser. No. 99-5285 by that Office.

BACKGROUND OF THE INVENTION

1. Field of the Invention

The present invention relates to a monitor, and in particular to a monitor having a detachable engaging structure adapted to a monitor casing formed of a front casing stably engaging to a rear casing.

2. Description of the Background Art

Generally, a monitor is capable of emitting an electron beam from an electron gun of a cathode ray tube toward a fluorescent material coated on the cathode ray tube based on an image 21 signal for generating different bright and color lights, so that it is possible to form a certain character, symbol, graphic, or other visual display.

The monitor includes a casing for protecting the inner structure including components such as the cathode ray tube (CRT), CRT control circuits, and power supplies from an external impact. The casing is formed of a front casing and a rear casing that are engaged by fasteners such as screws.

In the conventional engaging structure of the monitor casing, when engaging the rear casing to the front casing, the engaging positions of the screw and the hole must be accurately aligned, so that accurate work is required. In addition, during the engaging process, the front and rear casings must be manually engaged using a certain tool, so that the entire assembling process takes a long time. In addition, since the assembling and disassembling processes are repeatedly performed, the hole for the screw may be enlarged, so that it is impossible to implement a stable engagement between the front casing and the rear casing of the monitor.

An exemplar of the art, Helgeland (U.S. Pat. No. 4,662,797, *Adaptable Housing for a Video Terminal*, May 5, 1987) discloses fasteners such as screws to attach the front casing with the rear casing. Other exemplar art are Douken et al. (U.S. Pat. No. 5,793,494, *CRT Display Device*, Aug. 11, 1998), Lundgren et al. (U.S. Pat. No. 5,870,485, *Computer Visual Display Monitor with Integral Stereo Speaker and Directional Microphone and Method for Construction*, Feb. 9, 1999), Fazioli (U.S. Pat. No. 4,651,218, *Method and Apparatus for Mounting a CRT in a Dynamic (Vibration and Shock Prone) Environment*, Mar. 17, 1987), Leo et al. (U.S. Pat. No. 5,084,757, *Method and Apparatus for Mounting a Cathode Ray Tube to Minimize Tube Shift and Respect to a Bezel*, Jan. 28, 1992), and Lo (U.S. Pat. No. 5,122,928, *Monitor Housing*, Jun. 16, 1992).

SUMMARY OF THE INVENTION

It is therefore, an object of the present invention to provide a monitor casing capable of significantly decreasing the assembly time by having an easier assembling and disassembling operation of the front and rear casing.

It is another object to enhance the engaging state of the monitor.

It is a further object to avoid damage to the monitor housing while assembling and disassembling the monitor case multiple times.

It is yet another object to need less precision in assembling the monitor housing.

It is still a further object to allow easy and quick access to the internal parts of a monitor.

To achieve the above objects, there is provided a monitor having a cathode ray tube encased within a housing formed by engaging the front casing with a rear casing. The front casing has at least one snap portion at the upper rear surface and at least one engaging pin at the lower rear; A rear casing has at least one engaging portion at an upper front surface that detachably engages with the front casing. At least one receiving hole is formed at a lower portion of the front surface, so that the rear casing is integrally engaged with the front casing in such a manner that the receiving hole is separately engaged to the engaging pin, and a snap pin engaged in the receiving hole for preventing the engaging pin from disconnecting from the receiving hole in the case that the engaging pin of the front casing is integrally engaged into the receiving hole of the rear casing.

The snap portion has an elastic plate formed by cutting away a part of the inner structure of the snap portion, a rectangular engaging hole formed at an intermediate portion of the elastic plate and a slant surface formed at one end of the snap portion at a certain angle. The engaging portion includes an engaging shoulder portion fixed by an engaging hole of the snap portion and a pair of guides formed in both directions of the engaging shoulder portion, thus allowing the engaging portion to be stably engaged with the snap portion.

The distance between the guides is larger than the width of the snap portion, and both sides of the snap portion contact with the inner surfaces of the guides. The heights of the guides are lower than the height of the engaging shoulder portion, and the lengths of the guides are shorter than the length of the engaging shoulder portion. When the front and rear casing are integrally engaged, a certain gap is formed between the front and rear casings, so that a certain tool such as a driver is inserted into the gap when disassembling the front and rear casings.

The engaging pin is a rectangular bar, and a pair of reinforcing shoulder portions are formed at the upper end of the engaging pin, and an engaging portion is formed at an end portion of the lower surface of the engaging pin. A cut-away groove is formed at the top portion of the receiving hole, and a fixing hole is formed at a portion backwardly distanced from the cut-away portion, and a pair of engaging shoulder portions each having a slant surface are formed at the bottom portion, and the engaging portion of the engaging pin is engaged and disconnected with the engaging shoulder portions.

The snap pin includes a polygonal upper body, a lower body formed at a lower portion of the upper body and having one end divided into first and second members, and a connection portion for integrally connecting the upper and lower bodies. An engaging protrusion is downwardly protruding from one end of the upper body and is fixed at a fixing hole of the top portion. The width of the lower body is smaller than the distance between the reinforcing shoulder portions and is received between the reinforcing shoulder portions when the first and second members are aligned in the center direction of the shoulder portions.

Additional advantages, objects and features of the invention will become more apparent from the description which follows.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
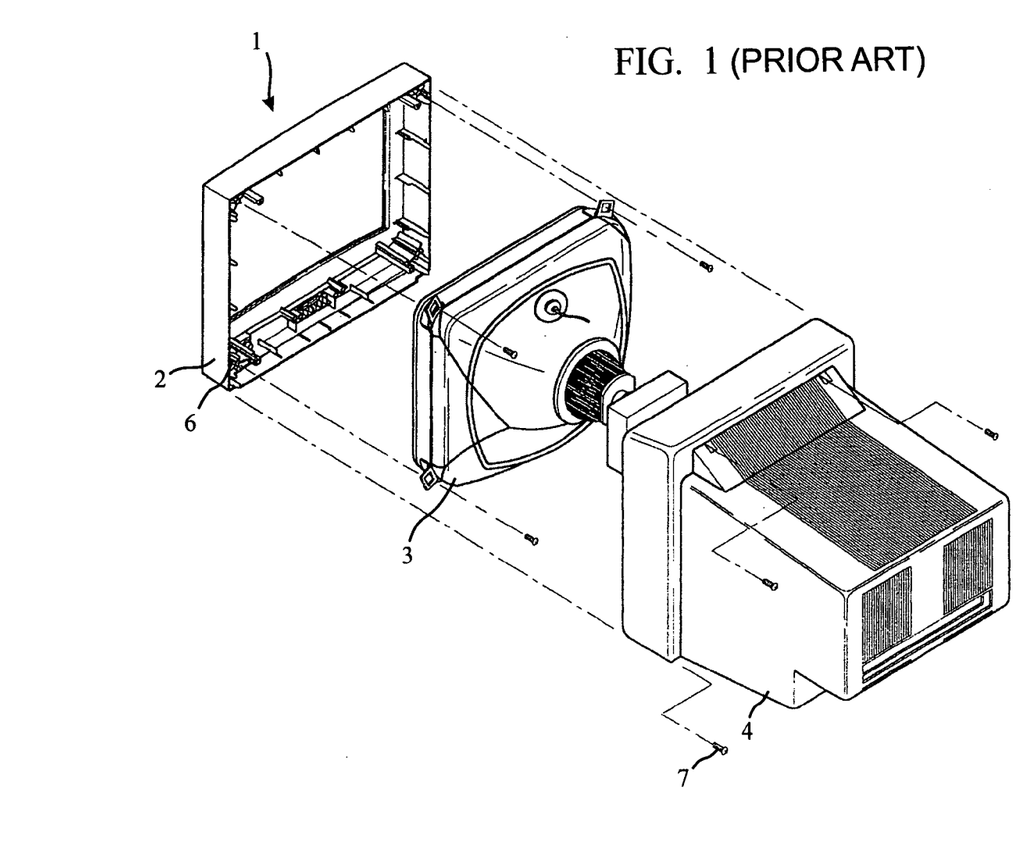
FIG. 1 is a disassembled perspective view illustrating an engaging structure of a monitor casing.
Figure 2:
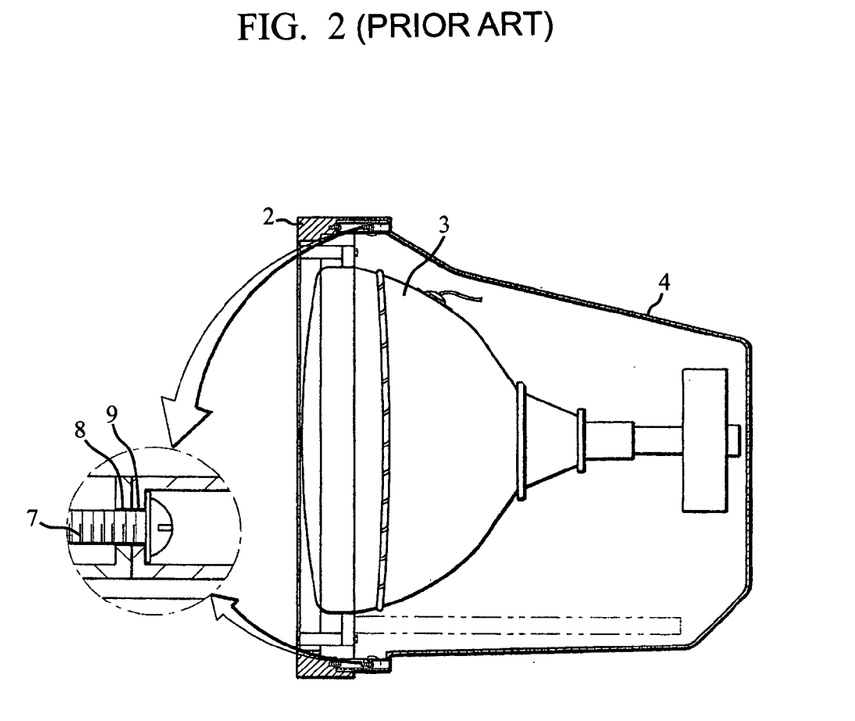
FIG. 2 is an enlarged cross-sectional view illustrating upper and lower engaging structures of a monitor casing.

Turning now to the drawings of FIGS. 1 and 2, the monitor 1 includes a front casing 2, a cathode ray tube 3 engaged to the back of the front casing 2, and a rear casing 4 integrally engaged with the front casing 2. A receiving groove 8 is formed at each corner portion of the back of a rim portion 6. In addition, a through hole 9 through which an engaging screw 7 passes is formed at each corner portion of the rear casing 4.

The engaging screw 7 is engaged into the receiving groove 8 of the front casing through the hole 9 of the rear casing 5, so that the front and rear casings 2 and 4 are integrally engaged. When disassembling the front and rear casings 2 and 4, the engaging screw 7 is loosened using a certain tool such as a driver or other similar tools.

Figure 3:
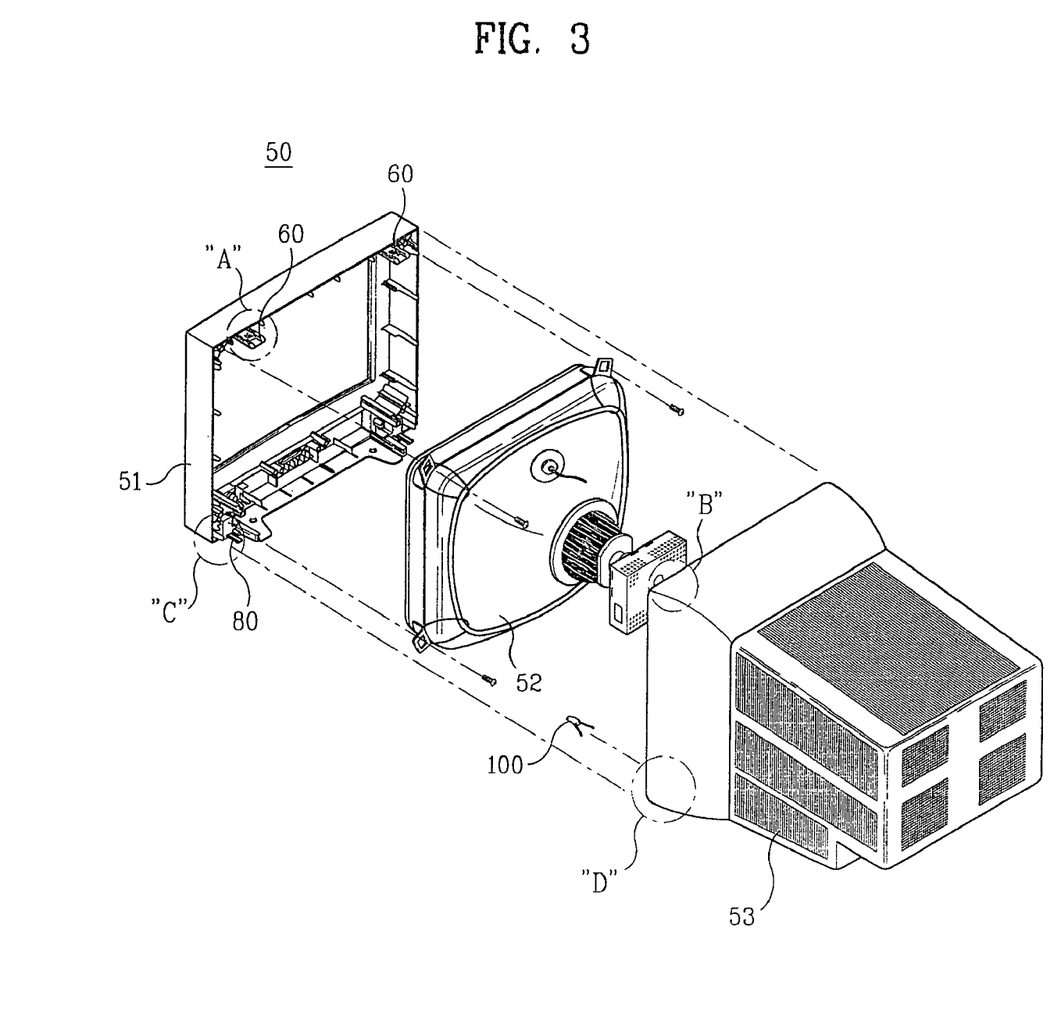
FIG. 3 is a disassembled perspective view illustrating an engaging structure of a monitor casing according to the present invention.

Referring to FIG. 3, a monitor 50 includes a front casing 51, a cathode ray tube 52 engaged to the back of the front casing 51, and a rear casing 53 integrally engaged with the front casing 51 for protecting the inner elements of the monitor from an external impact.

A plurality of snap portions (or indent portions) 60 are backwardly protruded from the upper portion of the back of the front casing 51. In addition, a plurality of engaging portions 70(FIG. 4) are formed at the front upper portion of the rear casing 53. Therefore, the engaging portions 70 are engaged to the snap portions 60, so that the front casing 51 and rear casing 53 are integrally engaged.

In addition, an engaging pin 80 is protruding from both rear lower portions of a rim portion of the front casing 51. A receiving hole 90 (FIG. 7) is formed at both front lower portions of the rear casing 53. Therefore, since the engaging pin 80 is engaged into the receiving hole 90, the lower portions of the front and rear casings, 51 and 53 respectively, are engaged. In addition, since the snap pin 100 is inserted into the receiving hole 90, the front casing 51 is not easily disassembled from the rear casing 53.

The snap portions and the engaging portions are explained in more detail with reference to FIGS. 4 and 5A through 5C. As shown therein, the snap portion 60 is backwardly protruding from the lower surface of the upper rim portion 56 of the front casing 51. The snap portion 60 is formed of a rectangular plate having a certain length and an elastic material. Three inner corner portions of the snap portion 60 are cut away, so that an elastic plate 62 having a proper elastic force is formed. In addition, a rectangular engaging hole 63 is formed at an intermediate portion of the elastic plate 62. A slant surface 64 having a certain slant angle is formed at one end of the snap portion 60.

Figure 4:
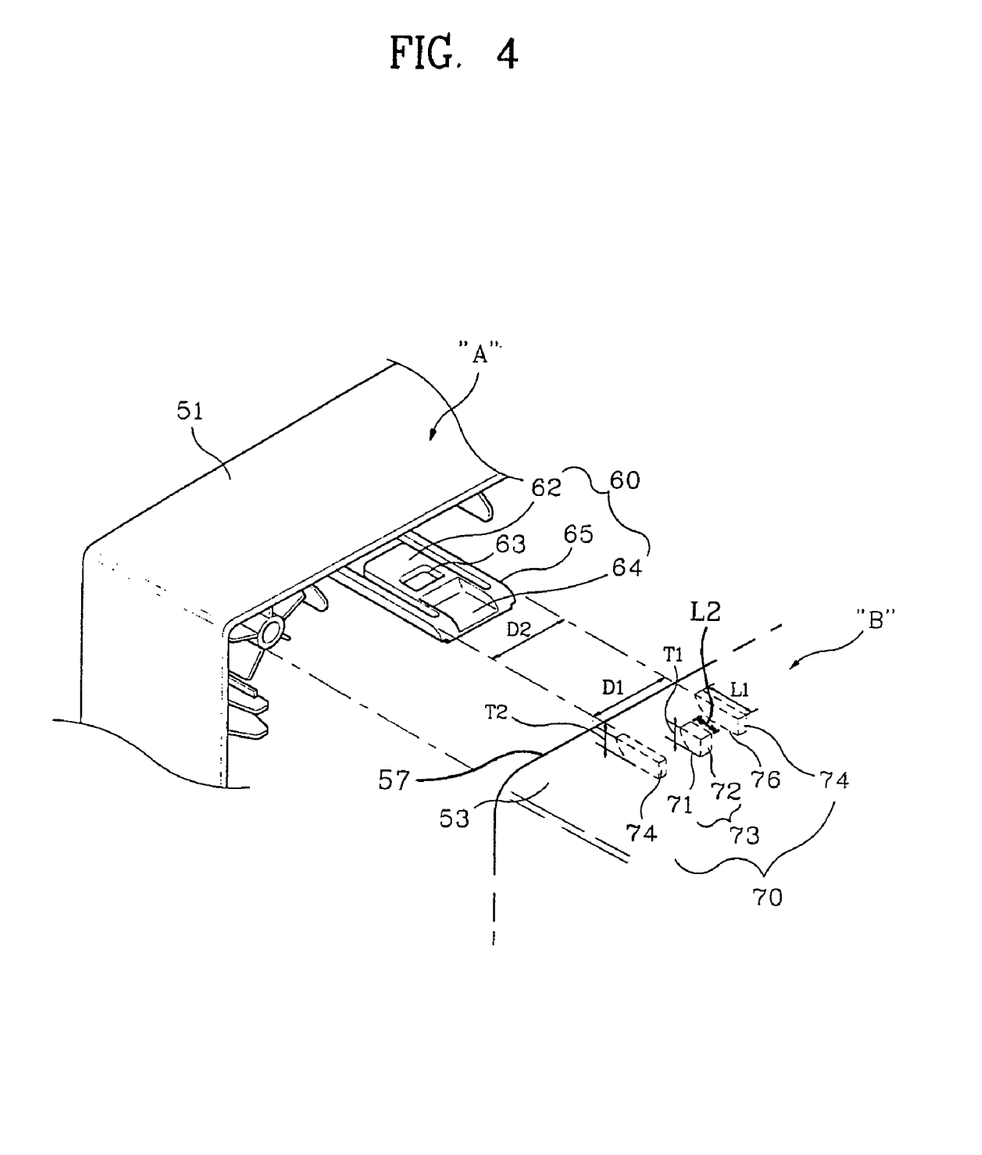
FIG. 4 is a perspective view illustrating an upper engaging structure of a front casing and a rear casing of a monitor according to the present invention.

In addition, the engaging portion 70 of the rear casing 53 is formed at a lower surface of the upper rim portion 57 of the rear casing 53 to correspond with the snap portion 60 of the front casing 51. The engaging portion 70 has an engaging shoulder portion 73 at an intermediate portion of the same, and a pair of guides 74 are formed at both sides of the engaging shoulder portion 73.

The front portion 71 of the engaging shoulder portion 73 is circular, and a vertical wall is formed at the rear surface portion 72, so that the engaging shoulder portion 73 slides on the slant surface 64 and is engaged to the engaging hole 63.

The length L1 of each of the guides 74 is longer than the length L2 of the engaging shoulder portion 73. In addition, the distance D1 between the guides 74 is larger than the length D2 in the direction of the width of the snap portion 60. Therefore, when the snap portion 60 is engaged to the engaging portion 70, the end portions of the guides 74 contact first with the outer surface of the snap portion 60, so that the engaging shoulder portion 73 is accurately engaged to the engaging hole 63 of the snap portion 60.

Figure 5A:
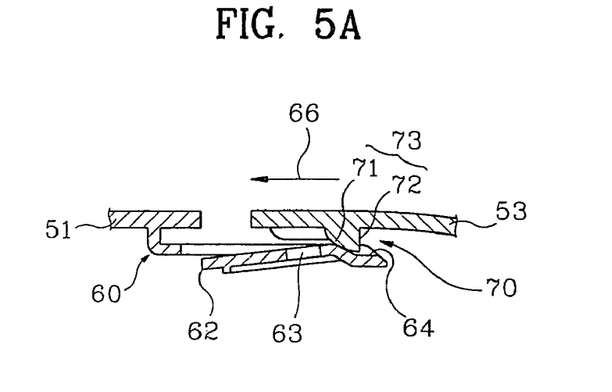
FIGS. 5A–5C illustrate an engaged state of the upper portions of a front casing and a rear casing of FIG. 4.
Figure 5B:
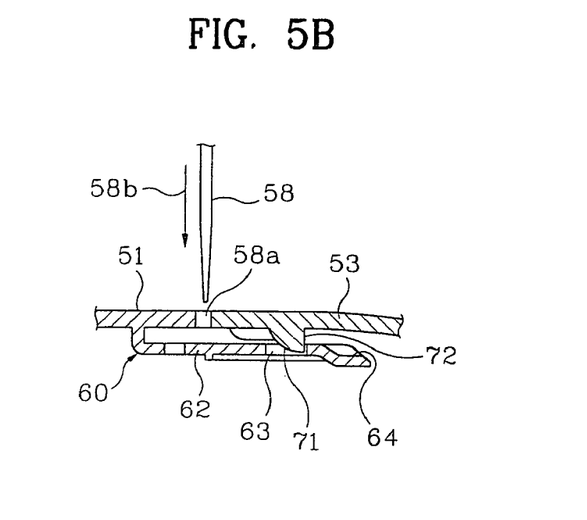

As shown in FIG. 5B, when the snap portion 60 and the engaging portion 70 are integrally engaged, a gap 58a is formed between the front and rear casings 51 and 53 respectively. A certain manual tool is inserted into the gap 58a when disassembling the front and rear casings, 51 and 53 respectively. When fabricating the snap portion 60 and the engaging portion 70, the size of the gap 58a is determined.

Figure 6:
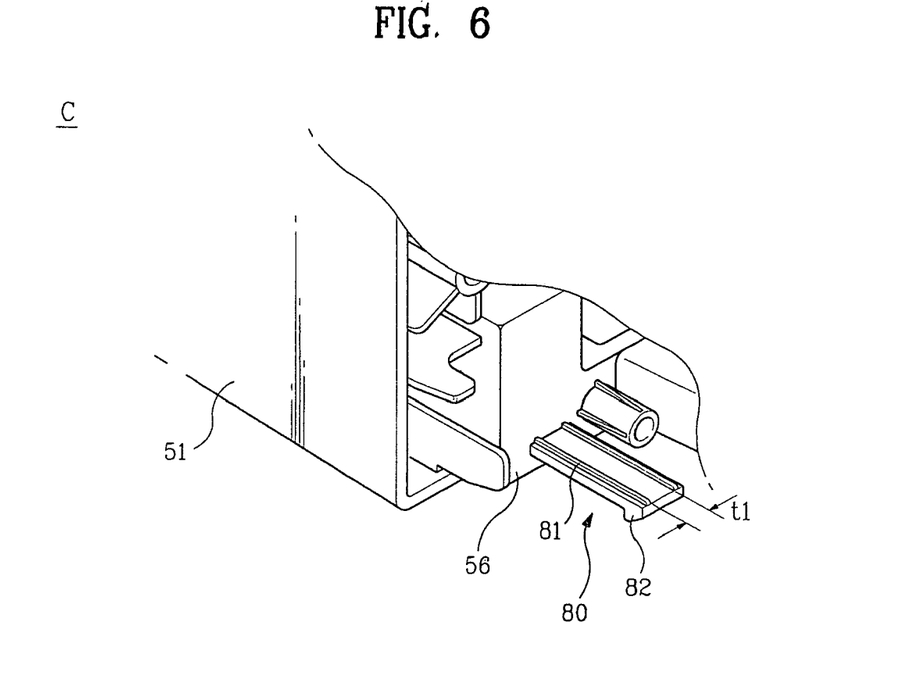
FIG. 6 is a perspective view illustrating the portion C of FIG. 3.
Figure 7:
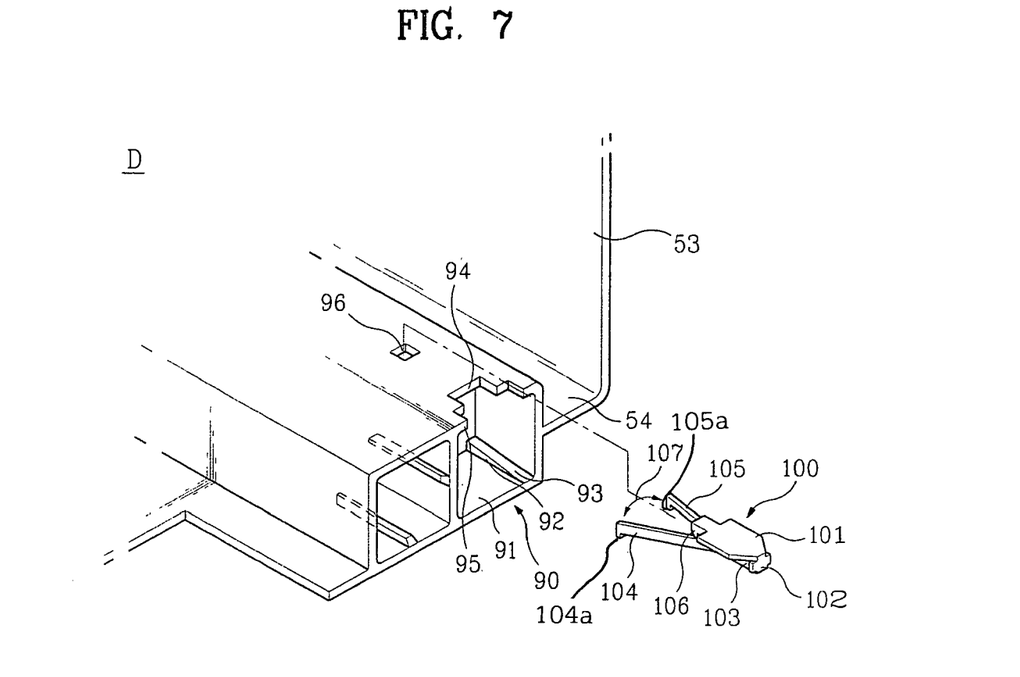
FIG. 7 is a perspective view illustrating the portion D of FIG. 3.
Figure 8:
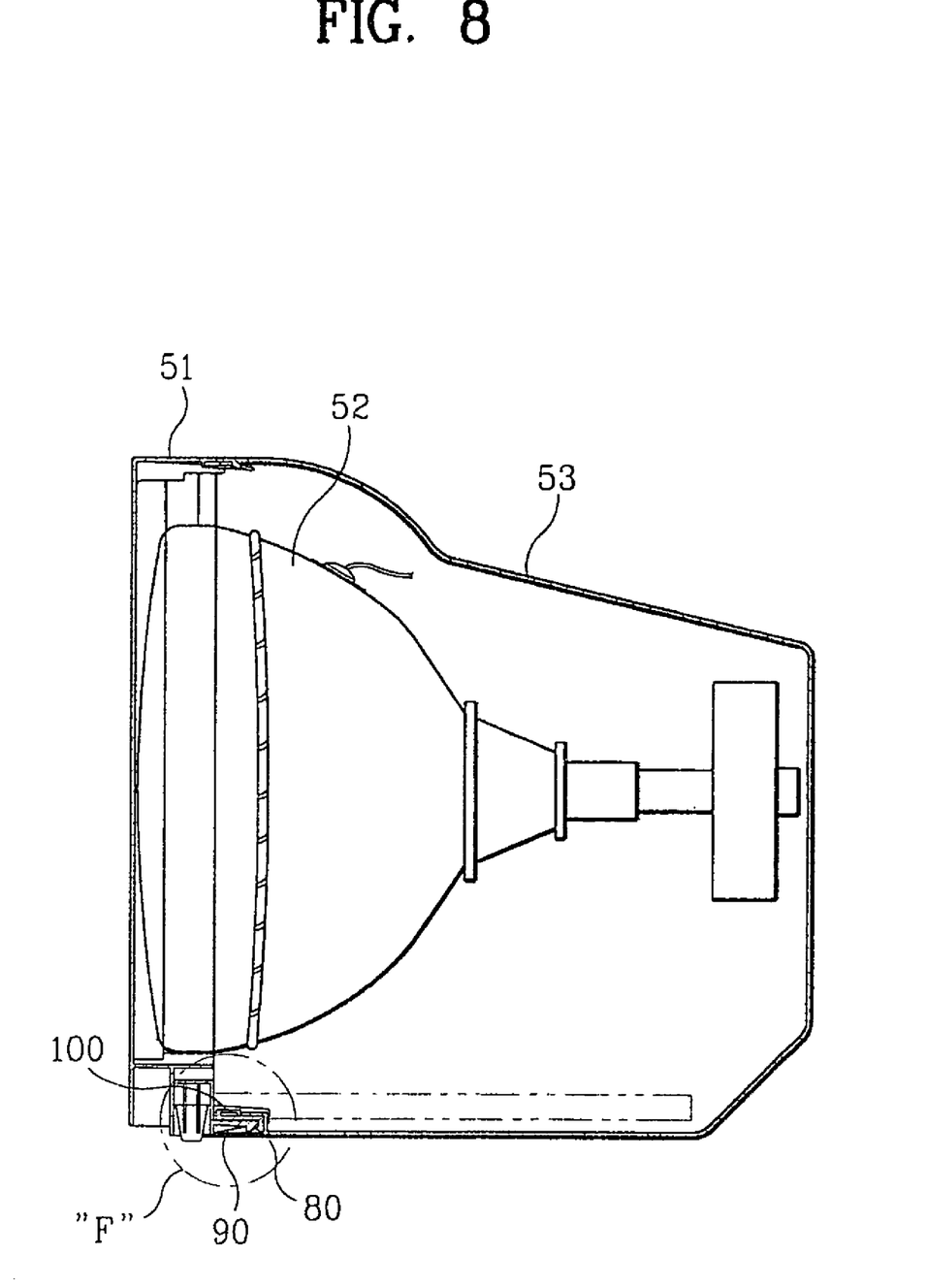
FIG. 8 is a cross-sectional view illustrating a lower engaging portion of a front casing and a rear casing according to the present invention.

The engaging structure of the lower portions of the front and rear casings is explained with reference to FIGS. 6 and 7. As shown therein, an engaging pin 80 is backwardly protruding from both rim portions 56 (on the left and right side) of the rear surface of the lower portion of the front casing 51. The engaging pin 80 is formed of a rectangular bar having a certain size. A pair of reinforcing shoulder portions 81 are formed at the upper portion of the engaging pin 80. An engaging portion (or detent) 82 is formed at a lower end portion of the engaging pin 80.

A pair of the reinforcing shoulder portions 81 are protruded from both upper surface portions of the engaging pin 80 and have a certain height. The reinforcing shoulder portions 81 are distanced by a predetermined distance t1.

A receiving hole 90 of the rear casing 53 is formed at both sides of the front lower portion 54 of the rear casing 53. The receiving hole 90 is rectangular and is extended backwardly by a certain distance and is accessible to the outside of the rear casing 53. A pair of engaging shoulder portions 92 are formed at both sides of a bottom portion 91 of the receiving hole 90. Since the engaging shoulder portions 92 have a slant surface, the rear portions of the engaging shoulder portions 92 are higher than the front portions of the same. Therefore, the engaging portion 82 of the engaging pin 80 of the front casing 51 slides backwardly along the slant surface 93 of the engaging shoulder portions 92 and is engaged with the engaging shoulder portions 92.

An engaging groove 94 cut-away in a step shape is formed at the top portion 95 of the receiving hole 90. A rectangular fixing hole 96 is formed through the top portion 95 of the receiving hole 90 at a certain distance from the engaging groove 94.

When the engaging pin 80 is engaged to the engaging shoulder portions 92 of the receiving hole 90, a user upwardly pushes the engaging pin 80, so that it is possible to manually separate without using a certain tool such as a driver. While the user is using the monitor 50, the lower portion of the casing may be opened. In order to prevent the above-described problem, a snap pin 100 is formed.

Figure 9:
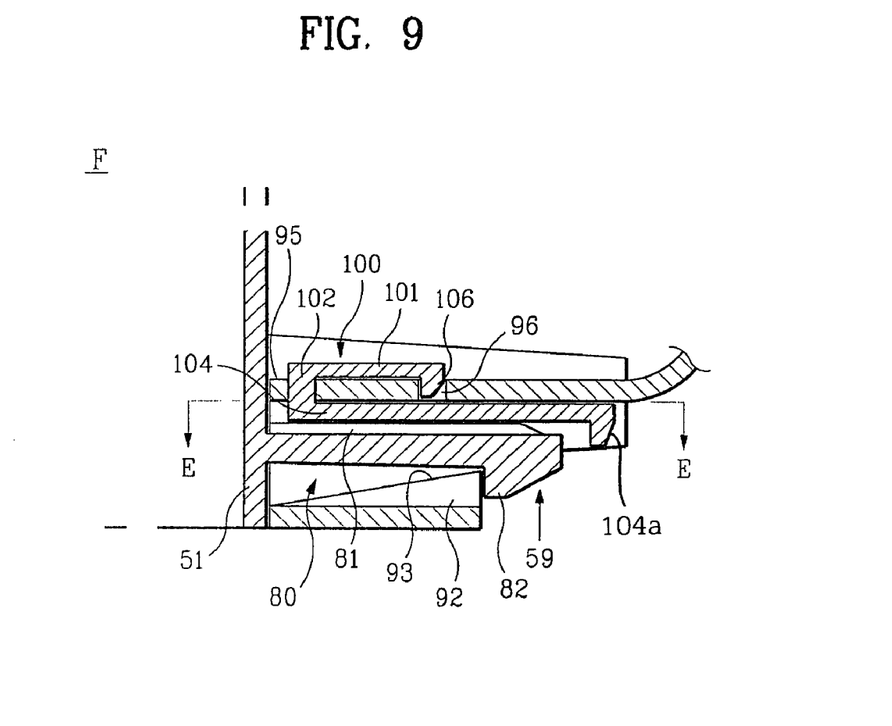
FIG. 9 is an enlarged cross-sectional view illustrating the portion F of FIG. 8.

The snap pin is explained in more detail with reference to FIGS. 7, 9 and 10. As shown therein, a snap pin 100 includes an upper body 101, a lower body 103 formed at a lower portion of the upper body 101, and a connection portion 102 for integrally connecting the upper and lower bodies 101 and 103.

The upper body 101 is formed of a polygonal plate and has a front portion integrally connected with the connection portion 102, and a protrusion (or detent) 106 is downwardly formed at the bottom of the end portion of the upper body 101.

The lower body 103 has a front end portion integrally connected with the connection portion 102. The end portion of the lower body 103 is formed in a V-shape separated into first and second members 104 and 105 respectively. The first and second members 104 and 105 are formed of an elastic force material and may be transformed in the arrow direction 107 in the drawings. In addition, the protrusions (or detents) 104a and 105a are downwardly projecting from the lower surface of the end portions of the first member 104 and second member 105 respectively. The upper and lower bodies 101 and 103 are integrally connected by the connection portion 102 having a certain height, and a certain space is formed between the upper and lower bodies 101 and 103.

In the case that the snap pin 100 is engaged into the receiving hole 90, the top portion 95 of the receiving hole 90 is inserted into the space. In addition, a protrusion 106 of the upper body 101 slides on the upper surface of the top portion 95 of the receiving hole 90 and is engaged with the fixing hole 96. Therefore, the snap pin 100 is engaged with the top portion 95 of the receiving hole 90.

Figure 10:
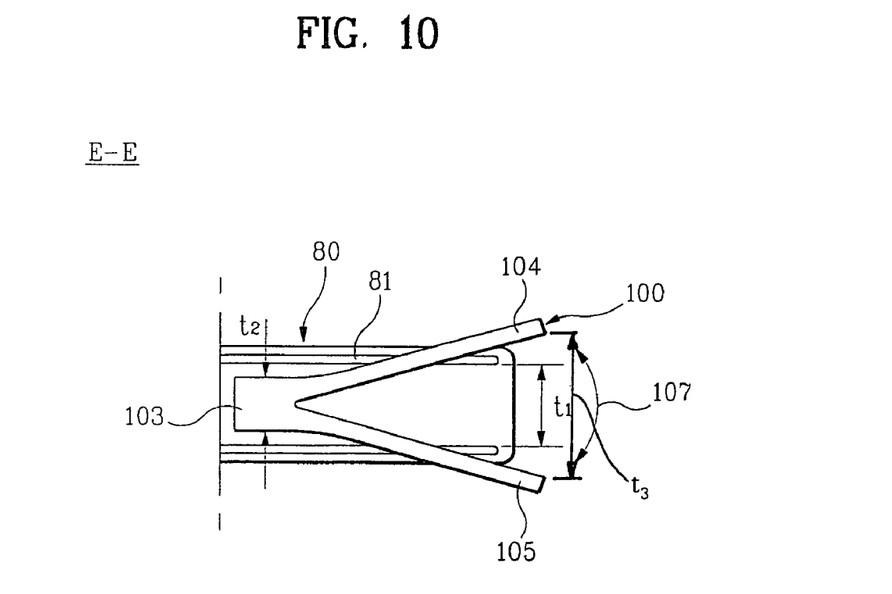
FIG. 10 is a cross-sectional view taken along line E—E of FIG. 9.

Referrring to FIG. 10, the width t2 of the lower body 103 is smaller than the distance t1 of the reinforcing shoulder portion 81 of the engaging pin 80. The distance t3 between the first member 104 and second member 105 is smaller than the distance t1 when the first member 104 and second member 105 of the lower body 103 are deformed in the direction opposite to the arrow 107 and are received between the reinforcing shoulder portions 81 of the engaging pin 80. On the other hand, in the case that the first and second members 104 and 105 are widened in the arrow direction 107, the distance t3 between the first and second members 104 and 105 is larger than the distance t1 of the reinforcing shoulder portions 81, so that the first and second members 104 and 105 are not received between the reinforcing shoulder portions 81, namely, are positioned at the top of the reinforcing shoulder portion 81.

Therefore, the snap pin 100 is positioned between the engaging pin 80 and the top portion 95 of the receiving hole 90, so that it is possible to prevent the engaging pin 80 from escaping from the engaging shoulder portion 92 of the receiving hole 90. The engaging operation of the monitor according to the present invention will be explained with reference to the accompanying drawings. As shown in FIGS. 4, 5A and 5B, in the case that the rear casing 53 is engaged to the front casing 51 by a user, the engaging portion 70 of the rear casing 53 is aligned at the engaging position with respect to the snap portion 60 of the front casing 51. In addition, the rear casing 53 is pushed in the arrow direction 66, so that the snap portion 60 is positioned between the guides 74.

When the inner surfaces 76 of the guides 74 contact with the outer surface 65 of the snap portion 60, the guides 74 guide so that the engaging shoulder portion 73 is accurately fixed by the snap portion 60.

When the engaging shoulder portion 73 contacts with the slant portion 64 of the snap portion 60, the front surface of the engaging shoulder portion 73 slides along the slant surface 64. At this time, the elastic plate 62 of the snap portion 60 downwardly moves. Therefore, the engaging shoulder portion 73 is inserted into the engaging hole 63 formed at the snap portion 60 beyond the slant surface 64, so that the upper portions of the front and rear casings 51 and 53 are integrally engaged.

Figure 5C:
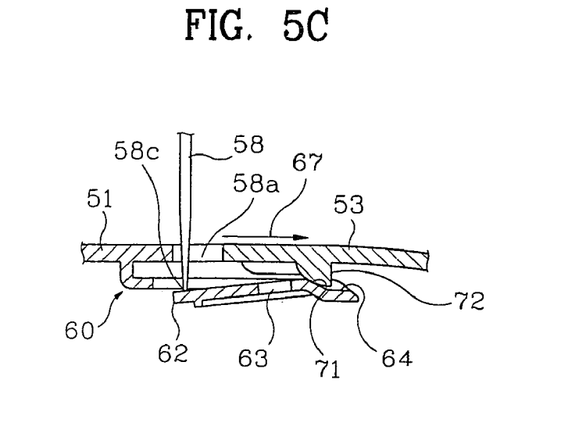

As shown in FIGS. 4, 5B and 5C, the case that the rear casing 53 is separated from the front casing 51 will be explained. First, a certain tool such as a driver 58 is inserted into the gap 58a formed between the front casing 51 and the rear casing 53. In addition, the driver 58 is pushed in the arrow direction 58b, so that the end portion 58c of the driver 58 contacts with the upper surface of the elastic plate 62 and downwardly pushes the elastic plate 62. In addition, the engaging plate 73 escapes from the engaging hole 63 of the elastic plate 62 by backwardly moving the rear casing 53. Therefore, the engaging shoulder portion 73 slides along the slant surface 64 of the snap portion 60 and is separated from the snap portion 60. As a result, the upper engaged portions of the front and rear casings 51 and 53 are separated from each other.

The upper engaging portions of a first side are separated, and the upper engaging portions of a second side are separated. Since the upper engaging structure of the second side is the same as the first side, the separation process is the same.

While the upper engaging portions of the second side are being separated, the separated upper engaging portions of the first side may be engaged again. In the upper engaging structure of the monitor 50, however, the engaging shoulder portion 73 is backwardly pushed by the length of the slant surface 64 and is detached from the snap portion 60. Therefore, it is possible to prevent a re-engagement at the upper engaging structure of one side.

The lower engagement of the monitor is explained with reference to FIGS. 7, 9 and 10. As shown therein, in the case that the user engages the rear casing 53 to the front casing 51, the snap pin 100 is engaged into the receiving hole 90 of the rear casing 53. Namely, the first member 104 and second member 105 of the snap pin 100 are aligned in the direction of the cut-away groove 96 formed at the top portion 95 of the receiving hole 90, and the snap pin 100 is pushed by an external 11, force. Therefore, the snap pin 100 is moved by an external force, and the protrusion 106 is backwardly moved along the upper surface of the top portion 95 of the receiving hole 90 and is engaged into the fixing hole 96.

At this time, the top portion 95 of the receiving hole 90 is positioned in a certain space formed by the upper body 101 and lower body 103. When the snap pin 100 is fixed in the receiving hole 90, the first member 104 and second member 105 pass through the receiving hole 90 and are protruding to the outside of the receiving hole 90.

At this time, the first member 104 and second member 105 are widened in the arrow direction 107. In addition, since a certain distance is maintained between the lower body 103 of the snap pin 100 and the bottom portion 91 of the receiving hole 90, the engaging pin 80 is inserted.

After the snap pin 100 is engaged into the receiving hole 90, the user aligns the front casing 51 and the rear casing 53 at an engaging position. In addition, the front casing 51 is backwardly moved, so that the engaging pin 80 is inserted into the receiving hole 90 of the rear casing 53. When the engaging pin 80 is inserted into the receiving hole 90, the engaging portion 82 of the engaging pin 80 contacts with the upper surfaces 93 of the engaging shoulder portions 92 of the receiving hole 90.

Therefore, the engaging portion 82 of the engaging pin 80 is engaged by the engaging shoulder portions 92, so that the lower portions of the front casing 51 and the rear casing 53 are integrally engaged. At this time, since an end portion of the engaging pin 80 is exposed to the outside of the lower surface of the rear casing 53, a user can disassemble using a certain tool such as a driver.

In the case that the lower portions of the front and rear casings 51 and 53 are separated, the user aligns the first member 104 and second member 105 of the snap pin 100 exposed to the outside of the lower surface of the rear casing 53 in the arrow direction 107. At this time, since the width t2 of the lower body 103 of the snap pin 100 is smaller than the distance t1 of the reinforcing shoulder portion 81 of the engaging pin 80, the snap pin 100 is received between the reinforcing shoulder portions 81. Therefore, since a certain space by which the engaging pin 80 is upwardly moved is formed, the engaging pin 80 is upwardly moved by a certain distance.

After the engaging pin 80 is upwardly moved by a certain distance, the user upwardly pushes the lower portion of the engaging pin 80 in the arrow direction 59, so that the engaging portion 82 of the engaging pin 80 is separated from the engaging shoulder portion 92 of the receiving hole 90. After the engaging pin 80 is separated from the receiving hole 90, the front casing 51 is forwardly moved by a certain distance, so that it is possible to separate the front casing 51 and the rear casing 53. After one side of the monitor is separated, the engaging portions of the other side may be separated in the same manner.

As described above, in the casing upper engaging structure of the monitor according to the present invention, an assembling process is simple, and the assembling time is decreased. In addition, the slant surface of the end portion of the snap portion has a certain length, so that it is possible to prevent a re-engagement of the upper portion of the other side while the upper engaging structure is separated. In the monitor casing according to the present invention, a certain tool such as a driver is not used based on the lower engaging structure of the snap method. It is possible to assemble and disassemble based on a decreased process, so that the assembling and disassembling time are decreased. In order to prevent the casing lower engaging structure of the monitor from being easily separated by an external impact, the snap pin is used, so that it is possible to prevent the front and rear casing from being randomly separated.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A monitor, comprising:
    a front casing having at least one snap portion at an upper rear surface of said front casing and at least one engaging pin at a lower rear surface of said front casing;
    a rear casing having at least one engaging portion at an upper front surface detachably engaging with the snap portion of said front casing, and at least one first hole formed at a lower portion of the front surface, said rear casing integrally engaged with said front casing in such a manner that the first hole is separately engaged to the engaging pin, said front and rear casings enclosing a cathode ray tube; and
    a snap pin engaging in the first hole accommodating the prevention of the engaging pin from detaching from the first hole when the engaging pin of the front casing is integrally engaged into the first hole of said rear casing.

2. The monitor of claim 1, wherein said snap portion includes an elastic plate formed by cutting away a part of an inner structure of said snap portion, a first aperture rectangular in shape formed at an intermediate portion of the elastic plate and a slant surface formed at one end of said snap portion at a certain angle.

3. The monitor of claim 2, wherein said engaging portion includes a first detent fixed by the first aperture of said snap portion and a pair of guides formed in both directions of the first detent, the first detent stably engaging with the snap portion.

4. The monitor of claim 3, wherein the front portion of the first detent is circular, and the rear portion of the first detent includes a vertical wall.

5. The monitor of claim 3, wherein the distance between the guides is larger than the width of the snap portion, and both sides of the snap portion contact with the inner surfaces of the guides.

6. The monitor of claim 5, wherein the heights of the guides are less than the height of the first detent, and the lengths of the guides are less than the length of the first detent.

7. The monitor of claim 6, wherein when the front and rear casing are integrally engaged, a certain gap is formed between the front and rear casings, so that a certain tool including a driver is inserted into the gap when disassembling the front and rear casings.

8. The monitor of claim 1, wherein the engaging pin is a rectangular bar, and a pair of first shoulder portions reinforcing the engaging pin are formed at the upper end of the engaging pin, and a second detent is formed at an end portion of the lower surface of the engaging pin.

9. The monitor of claim 8, wherein a groove is formed at a top portion of an outer wall of the first hole, and a second aperture is formed at a portion backwardly distanced from the groove, and a pair of second shoulder portions each having a slant surface are formed at the bottom portion of the outer wall of the first hole, and the second detent of the engaging pin is engaged and disconnected with the second shoulder portions.

10. The monitor of claim 9, wherein said snap pin further comprising:
    a polygonal upper body;
    a lower body formed at a lower portion of said upper body and having one end divided into first and second members; and a connection portion accommodating integral connection of the upper and lower bodies.

11. The monitor of claim 10, wherein a third shoulder portion is downwardly protruding from one end of said upper body and is fixed at a second hole of the top portion of the outer wall of the first hole.

12. The monitor of claim 10, wherein the width of the lower body is less than the distance between the first shoulder portions and the lower body is received between the first shoulder portions when the first member is substantially parallel with the second member.

13. A monitor having a cathode ray tube, comprising:
a front casing;
a rear casing engaging with said front casing enclosing the cathode ray tube;
an indent portion protruding from said front casing and said rear casing in a certain direction;
a detent portion forming at the opposite casing of said indent portion, said indent portion elastically transforming and inserting into said detent portion, and elastically transforming in the same direction as the engaging direction for thereby disassembling the front and rear casings; and
a guide forming at said detent portion accommodating the direction of said indent portion to said detent portion in an engaging position.

14. The monitor of claim 13, wherein an engaging groove forming at said indent portion, a detent of said detent portion having a circular wall formed in the direction of the engaging groove and a vertical wall in the opposite direction, when engaging said indent portion with said detent portion, the indent portion is transformed by the circular wall, the detent is received into the engaging groove of the indent portion, and when a certain separation force is applied, the vertical wall is engaged with the engaging groove for thereby supporting the front and rear casings.

15. The monitor of claim 14, wherein a gap is formed between said front casing and said rear casing allowing a certain tool to be inserted into the gap thereby pushing the indent portion, and transforming the detent so that the front and rear casings are separated from each other.

16. A monitor having a front casing and a rear casing for receiving a cathode ray tube, comprising:
an engaging pin extending from one of the front and rear casings in the direction of the opposite casing;
a wall surrounding a first hole engaging with said engaging pin when the engaging pin slides to the first hole; and
a snap pin engaged in said wall surrounding the first hole when said engaging pin is engaged in the first hole accommodating the prevention of said engaging pin from disengaging from said wall.

17. The monitor of claim 16, further comprising:
a groove forming at the top portion of said wall surrounding the first hole;
a first aperture forming at a portion backwardly distanced from the groove;
a pair of first shoulder portions each having a slant surface forming at a bottom portion of said wall surrounding the first hole; and
a first detent of the engaging pin connecting and disconnecting with the first shoulder portions.

18. The monitor of claim 16, wherein said engaging pin is a rectangular bar with a pair of second shoulder portions forming at the upper end of said engaging pin, and a second detent forming at an end portion of the lower surface of said engaging pin.

19. The monitor of claim 16, wherein said snap pin further comprising:
a polygonal upper body;
a lower body formed at a lower portion of said upper body and having one end divided into first and second members; and
a connection portion accommodating integral connection of the upper and lower bodies.

20. The monitor of claim 16, further comprising:
an indent portion protruding from said front casing and said rear casing in a certain direction;
a detent portion formed at the opposite casing of said indent portion, said indent portion elastically transformed and inserted into said detent portion, and elastically transforming in the same direction as the engaging direction for thereby disassembling the front and rear casings; and
a guide formed at said detent portion accommodating the direction of said indent portion to said detent portion in an engaging position.

21. A method of constructing a monitor housing, comprising the steps of:
forming a front casing having at least one snap portion at an upper rear surface of said front casing and at least one engaging pin at a lower rear surface of said front casing;
forming a rear casing having at least one engaging portion at an upper front surface detachably engaging with the snap portion of said front casing, and at least one first hole formed at a lower portion of the front surface, said rear casing integrally engaging with said front casing in such a manner that the first hole is separately engaged to the engaging pin, said front and rear casings enclosing a cathode ray tube; and
forming a snap pin engaging in the first hole accommodating the prevention of the engaging pin from detaching from the first hole when the engaging pin of the front casing is integrally engaged into the first hole of said rear casing.

22. The method of claim 21, wherein forming the snap portion comprising the steps of
forming an elastic plate by cutting away a part of an inner structure of said snap portion;
perforating a first aperture in a rectangular shape at an intermediate portion of the elastic plate; and
forming a slant surface at one end of said snap portion at a certain angle.

23. The method of claim 22, wherein said engaging portion forms a first detent fixed by the first aperture of said snap portion and a pair of guides formed in both directions of the first detent, the first detent stably engaging with the snap portion.

24. The method of claim 23, wherein the distance between the guides is larger than the width of the snap portion, and both sides of the snap portion contact with the inner surfaces of the guides.

25. The method of claim 21, wherein forming said snap pin further comprising the steps of:
forming a polygonal upper body;
forming a lower body at a lower portion of said upper body;
dividing one end of said lower body into first and second members; and
forming a connection portion accommodating integral connection of the upper and lower bodies.

* * * * *